(12) United States Patent
Denchev (10) Patent No.: US 11,205,134 B2
(45) Date of Patent: Dec. 21, 2021

(54) NUMERICAL QUANTUM EXPERIMENTATION

(71) Applicant: Google LLC, Mountain View, CA (US)

(72) Inventor: Vasil S. Denchev, West Lafayette, IN (US)

(73) Assignee: Google LLC, Mountain View, CA (US)

( * ) Notice: Subject to any disclaimer, the term of this patent is extended or adjusted under 35 U.S.C. 154(b) by 258 days.

(21) Appl. No.: 16/344,833

(22) PCT Filed: Nov. 1, 2016

(86) PCT No.: PCT/US2016/059873
§ 371 (c)(1),
(2) Date: Apr. 25, 2019

(87) PCT Pub. No.: WO2018/084829
PCT Pub. Date: May 11, 2018

(65) Prior Publication Data
US 2019/0258952 A1 Aug. 22, 2019

(51) Int. Cl.
*G06N 10/00* (2019.01)
*G06F 17/17* (2006.01)
(Continued)

(52) U.S. Cl.
CPC ............ *G06N 10/00* (2019.01); *G06F 17/17* (2013.01); *G06Q 10/00* (2013.01); *G06Q 10/04* (2013.01); *G06N 20/00* (2019.01)

(58) Field of Classification Search
CPC ........ G06N 10/00; G06N 20/00; G06F 17/17; G06Q 10/10; G06Q 10/04
(Continued)

(56) References Cited

U.S. PATENT DOCUMENTS

| 2006/0107266 A1 | 5/2006 | Martin et al. |
| 2015/0160968 A1 | 6/2015 | Egenolf |
| 2017/0255872 A1* | 9/2017 | Hamze ................... G06F 15/76 |

FOREIGN PATENT DOCUMENTS

| WO | WO 2016/029172 | 2/2016 |
| WO | WO2016/061283 | 4/2016 |

OTHER PUBLICATIONS

PCT International Search Report and Written Opinion in International Appln. No. PCT/US2016/059873, dated Dec. 9, 2016.
(Continued)

*Primary Examiner* — Tan V Mai
(74) *Attorney, Agent, or Firm* — Fish & Richardson P.C.

(57) ABSTRACT

Methods, systems, and apparatus for numerical quantum experimentation. In one aspect, a method includes identifying (i) a computational problem that is a candidate for a quantum computation, and (ii) one or more numerical algorithms for solving the candidate computational problem; providing input task data identifying (i) the candidate computational problem, and (ii) the one or more numerical algorithms, to a numerical quantum experimentation system, wherein the numerical quantum experimentation system comprises multiple universal numerics workers, a universal numerics worker, of the multiple universal numerics workers being configured to solve the candidate computational problem using the one or more numerical algorithms; receiving, from the numerical quantum experimentation system, data representing results of the one or more numerical algorithms to solve the candidate computational problem; and determining whether the received data indicates that a quantum computation applied to the candidate computational problem has a greater efficacy for arriving at a solution than a classical computation applied to the candidate computational problem.

30 Claims, 4 Drawing Sheets

(51) Int. Cl.
    *G06Q 10/00*     (2012.01)
    *G06Q 10/04*     (2012.01)
    *G06N 20/00*     (2019.01)

(58) Field of Classification Search
    USPC .......................................................... 708/200
    See application file for complete search history.

(56) References Cited

OTHER PUBLICATIONS

Contal et al., "Parallel Gaussian process optimization with upper confidence bound and pure exploration," arXiv, Apr. 2013, 16 pages.

AU Office Action in Australian Application No. 3042183, dated Jun. 4, 2020, 6 pages.

\* cited by examiner

NUMERICAL QUANTUM EXPERIMENTATION

BACKGROUND

This specification relates to quantum computing.

Quantum computing machinery has the potential to solve certain computational problems faster than any classical computers that use the best currently known algorithms. In addition, quantum computing machinery promises to efficiently solve some computational problems that are too hard or not practically feasible on classical computers.

SUMMARY

This specification describes technologies for determining whether quantum computing machinery can be used to more efficiently solve computational problems that are believed to be too hard or not practically feasible for classical computers.

In general, one innovative aspect of the subject matter described in this specification can be implemented in methods that include identifying (i) a computational problem that is a candidate for a quantum computation, and (ii) one or more numerical algorithms for solving the candidate computational problem; providing input task data identifying (i) the candidate computational problem, and (ii) the one or more numerical algorithms, to a numerical quantum experimentation system, wherein the numerical quantum experimentation system comprises multiple universal numerics workers, a universal numerics worker, of the multiple universal numerics workers being configured to solve the candidate computational problem using the one or more numerical algorithms; receiving, from the numerical quantum experimentation system, data representing results of the one or more numerical algorithms to solve the candidate computational problem; and determining whether the received data indicates that a quantum computation applied to the candidate computational problem has a greater efficacy for arriving at a solution than a classical computation applied to the candidate computational problem.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations multiple universal numerical workers comprise a same binary, the binary comprising a predetermined set of numerical algorithms in a compiled form.

In some implementations the universal numerics worker is configured to receive dynamical instructions from a numerical quantum experimentation system taskmaster to execute a particular algorithm in the predetermined set of numerical algorithms through configuration received as part of an input task provided by a numerical quantum experimentation system client via the taskmaster.

In some implementations the universal numerics worker comprises a numerics interface that shields the universal numerics worker from knowledge particular to any specific numerical algorithm.

In some implementations the binary comprises an experimental design logical layer that is configured to apply machine learning algorithms to determine learned parameters for a current input task based on completed input tasks.

In some implementations the universal numerics worker comprises a respective cache of constructed numerics data objects from prior input tasks, and wherein the method further comprises, in response to receiving a new input task: determining, by the universal numerics worker, whether the cache comprises data required for the new input task; and in response to determining that the cache comprises data required for the new input task, retrieving and using the data required for the new input task.

In some implementations the method further comprises, in response to determining that a quantum computation applied to the candidate computational problem has a greater efficacy for arriving at a solution than a classical computation applied to the candidate computational problem, performing a quantum computation to solve the candidate computational problem.

In some implementations determining that a quantum computation applied to the candidate computational problem has a greater efficacy for arriving at a solution than a classical computation applied to the candidate computational problem comprises determining that the candidate computational problem experiences a quantum speed up when solved using quantum computation.

In some implementations the candidate computational problem comprises one or more of (i) classically simulating a quantum system or (ii) an abstract computational problem.

In some implementations the one or more numerical algorithms comprise one or more of (i) classical simulations of quantum systems, (ii) physically motivated classical algorithms, or (iii) abstract classical algorithms.

In some implementations identifying one or more numerical algorithms for solving the candidate computational problem further comprises, for an identified numerical algorithm, identifying a respective set of parameter values for the algorithm.

In some implementations receiving data representing results of the one or more numerical algorithms to solve the candidate computational problem comprises receiving data representing a result when the respective result is available.

In some implementations data representing a result of a respective numerical algorithm to solve the candidate computational problem comprises data representing respective computation time.

In some implementations determining whether the received data indicates that a quantum computation applied to the candidate computational problem has a greater efficacy for arriving at a solution than a classical computation applied to the candidate computational problem comprises: determining, for each numerical algorithm used to solve the candidate computational problem, an algorithm runtime; analyzing the determined runtimes to determine whether the received data indicates that a quantum computation applied to the candidate computational problem has a greater efficacy for arriving at a solution than a classical computation applied to the candidate computational problem.

In some implementations the one or more numerical algorithms comprise (i) a classical simulation of a quantum system, and (ii) one or more classical algorithms, and wherein analyzing the determined runtimes to determine whether the received data indicates that a quantum computation applied to the candidate computational problem has a greater efficacy for arriving at a solution than a classical computation applied to the candidate computational problem comprises comparing the runtime of the classical simulation of the quantum system to the runtimes of each of the one or more classical algorithms to determine whether the runtime of the classical simulation of the quantum system is shorter than the runtimes of each of the one or more classical algorithms.

In some implementations determining whether the received data indicates that a quantum computation applied to the candidate computational problem has a greater efficacy for arriving at a solution than a classical computation applied to the candidate computational problem comprises: analyzing the received data to extrapolate a scaling law for computation runtime as a function of problem size; and based on the scaling law, determining whether a quantum computation applied to the candidate computational problem has a greater efficacy for arriving at a solution than a classical computation applied to the candidate computational problem.

In some implementations determining whether the received data indicates that a quantum computation applied to the candidate computational problem has a greater efficacy for arriving at a solution than a classical computation applied to the candidate computational problem comprises: using the received data to determine an approximability measure of quantum computation and classical computation; and based on the determined approximability measure, determining whether the received data indicates that a quantum computation applied to the candidate computational problem has a greater efficacy for arriving at a solution than a classical computation applied to the candidate computational problem.

In some implementations the universal numerics worker is configured to issue resource adjustment commands based on current load as measured by a number of tasks waiting for completion.

In some implementations the numerical quantum experimentation system comprises multiple taskmasters, wherein a taskmaster of the multiple taskmasters is configured to manage universal numerics workers that are located within a predetermined distance to the taskmaster.

In some implementations the numerical quantum experimentation system is configured to receive input tasks from multiple users of the numerical quantum experimental system.

The subject matter described in this specification can be implemented in particular ways so as to realize one or more of the following advantages.

A numerical quantum experimentation system, as described in this specification, may facilitate the process of numerical experimentation within quantum computing facilities. The numerical quantum experimentation system described effectively solves the problem of scaling a user's capacity for easily and quickly exploring new ideas and applications of quantum computing via arbitrary sets of potentially very heavy numerical studies.

A numerical quantum experimentation system, as described in this specification, may enable research scientists to run numerical experiments via a user friendly frontend that does not require expert coding skills in order to obtain a new, previously unseen set of potentially very large numerical studies completed. A user may write a simple text file describing the algorithms that need to be run, together with the problem instances and possibly some parameter guesses for each algorithm. Then a simple script, e.g., in Python, generates all the required input tasks, submits them to appropriate components of the system, and delivers back the results whenever they are available.

A numerical quantum experimentation system, as described in this specification, may streamline and automate the experimentation pipeline, drastically shortening the total amount of time required for completing large batches of numerical tasks. The numerical quantum experimentation system may enable efficient use of large cross datacenter resources while running at minimal priority and avoiding interference with production tasks. In addition, the numerical quantum experimentation system may dynamically adjust deployed resources according to user time constraints and achieved progress towards completion of the numerical tasks constituting a full experimental suite.

Compared to alternative approaches to distributed computation, the numerical quantum experimentation system described in this specification completes all requisite tasks in significantly shorter times both in terms of total CPU usage and human experimenter person hours. For example, the numerical quantum experimental system may reduce total experimentation turnaround time to just a few hours or days down from several weeks or months. In addition, compared to alternative approaches to distributed computation, the numerical quantum experimentation system described in this specification does not require manual performance of multi-round multi-dimensional grid searchers over hyperparameter space.

A numerical quantum experimentation system, as described in this specification, may implement automatic resource adjustment. There may be several benefits of automating resource adjustment. For example, automatic resource adjustment removes the need to continuously monitor the system load and make repeated manual adjustments. In addition, energy and overall computational resource savings may be achieved compared to other numerical experimentation systems. Furthermore, automated resource adjustments may be more accurate and timely than any human intervention or other numerical experimentation system.

A numerical quantum experimentation system, as described in this specification, may implement a respective caching strategy. With large hyperparameter spaces for individual numerical algorithms and with large numbers of numerical algorithms to be evaluated, this caching strategy can potentially result in significant efficiency improvements and avoidance of unnecessary contention at locations where instance data is stored.

A numerical quantum experimentation system, as described in this specification, includes multiple universal numerics workers. The particular design of the numerics workers, e.g., their universality, enables numerics workers to execute any implemented numerical algorithms, solely based on a configuration specified by a user of the numerical quantum experimentation system and submitted by the user to the taskmaster via the client. Universal numerics workers, as described in this specification, allow for many different numerical algorithms to be packaged together in the same binary that numerics workers execute. Since a client component may submit tasks requesting the completion of runs using any of the different available numerical algorithms, the ability of a worker to select the appropriate algorithm in its portfolio and appropriately execute it is crucial to the attained efficiency and ease of use of the overall experimentation pipeline. Unlike the numerical quantum experimentation system described in this specification, other numerical experimentation systems typically have separate binaries for each potentially needed numerical algorithm and have workers shutting down and swapping binaries whenever a different numerical algorithm is requested by a given task. This is extremely inefficient and degenerates into the unsatisfactory level of performance that can be achieved with alternative technologies.

A numerical quantum experimentation system, as described in this specification, may include an experimental design logical layer. The experimental design logical layer reduces input from human scientists to a minimum level. For example, a human scientist may only need to initialize the numerical quantum experimentation system by specifying the problem instances, the numerical algorithms of interest, and in some implementations a loose guess of initial parameter ranges that can be used for bootstrapping the experimental design algorithm. After the experimental design algorithm detects satisfied termination criteria, it stops the generation of new tasks, waits for the completion of any remaining ones (or just terminates them), and finally the human scientist receives data representing a summary of salient results.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Quantum computing machinery has the potential to solve certain computational problems faster than any classical computers that use the best currently known algorithms. In addition, quantum computing machinery promises to efficiently solve some computational problems that are too hard or not practically feasible on classical computers. However, identifying which computational problems may benefit from quantum computation is a complex task requiring arbitrary sets of potentially very heavy numerical studies.

This specification describes an apparatus and method for performing numerical quantum experimentation. The described apparatus and method provide a computational framework for performing numerical experiments to determine whether quantum computations applied to candidate computational problems have greater efficacy for arriving at a solution than classical computation applied to the candidate computational problem.

Factors that may contribute to a quantum computation having greater efficacy than a classical computation when applied to a candidate computational problem include one or more of: computation runtime, e.g., run times for problem instances at fixed sizes, scaling behavior of runtime with respect to computational problem input size, e.g., scaling behavior for problem instances at increasing sizes, computational problem significance, classical overheads of the quantum computation or quantum hardware design complexity, or comparison of runtime scalings for achieving approximate (as opposed to exact) solutions at particular levels of desired quality. Additional factors may include economic viability of particular hardware proposals, e.g., research and development costs, time to market and economic value of solving problems that the developed hardware can solver versus solving the problems classically. Furthermore, approximability may be a factor, e.g., how quantum and non-quantum methods compare when the goal is to find a solution of a certain quality Q or better, where Q represents an approximate solution rather than an exact optimal solution to a problem.

For example, a quantum computation may be determined as having greater efficacy than a classical computation when applied to a same candidate computational problem if the runtime of the quantum computation is shorter than the runtime of the classical computation. As another example, a quantum computation may be determined as having greater efficacy than a classical computation when applied to a same candidate computational problem if the candidate computational problem input size exceeds a classically feasible threshold.

In addition, a classical computation may be determined as having greater efficacy than a quantum computation when applied to a same candidate computational problem if the quantum computation provides a minor reduction in computation runtime yet the candidate computational problem is not significant enough to justify performing a quantum computation. As another example, a classical computation may be determined as having greater efficacy than a quantum computation when applied to a same candidate computational problem if the quantum computation provides a reduction in computation runtime yet classical overheads associated with the quantum computation outweigh the gain achieved in the computation runtime.

EXAMPLE OPERATING ENVIRONMENT

Figure 1:
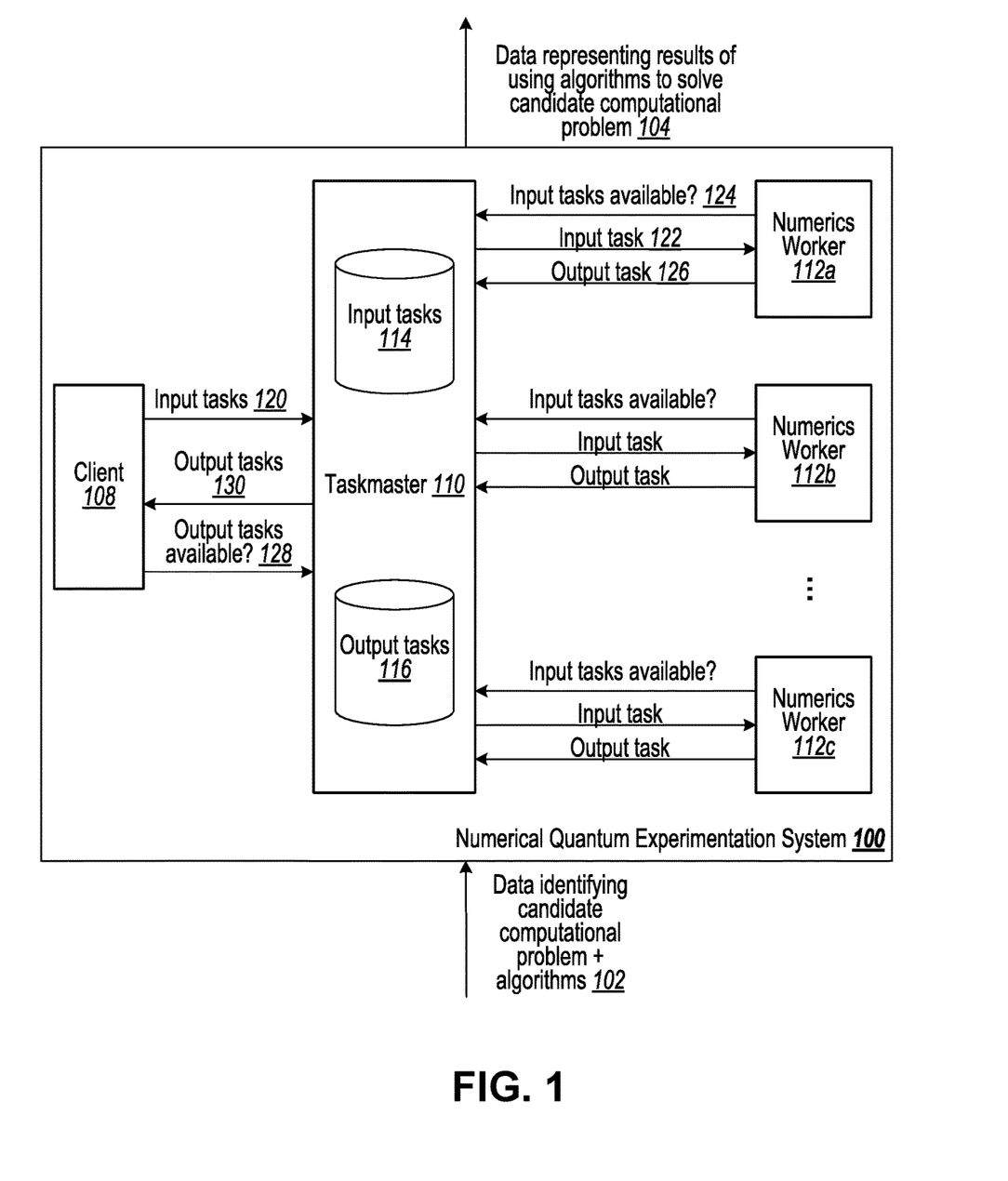
FIG. 1 depicts an example numerical quantum experimentation system.

FIG. 1 depicts an example numerical quantum experimentation system 100. The example system 100 is an example of a system implemented as classical or quantum computer programs on one or more classical computers or quantum computing devices in one or more locations, in which the systems, components, and techniques described below can be implemented.

The numerical quantum experimentation system 100 may include a client 108, taskmaster 110 and multiple universal numerics workers 112a-c. For convenience three universal numerics workers 112a-c are shown in FIG. 1, however the numerical quantum experimentation system 100 may include more or fewer universal numerics workers.

The taskmaster 110 may be configured to store received tasks, e.g., tasks received from client 108, organized into groups, with each task belonging to exactly one group. In some implementations the taskmaster 110 may be a lightweight database or other data storage structure. A task may contain a client-specified payload, e.g., in the form of a serialized protocol buffer message or some other arbitrary string. An individual task may be used to represent a unit of numerical work that needs to be completed as part of a larger collection of numerical tasks enumerated along different possible dimensions such as algorithms, problem instances or input parameters.

Universal numerics workers 112a-c in the numerical quantum experimentation system 100 may include binaries, e.g., compiled in C++, that may execute on separate machines, possibly even on different data centers, in an infinite loop in which the taskmaster 110 is periodically queried for available input tasks. If an input task is provided, the universal numerics worker takes ownership of the task and performs work according to a task specification received from the taskmaster 110. Results are submitted back to the taskmaster 110 in the form of an output task structured similarly to the input task, e.g., a payload consisting of a serialized protocol buffer message or an arbitrary string of some other type that the client 108 can eventually parse. The configuration of the numerical quantum experimentation system 100 may guarantee atomic consumption of an input task and production of a corresponding output task. On the user side, a client binary 108 may initially submit input tasks to the taskmaster 110 and periodically query the taskmaster 110 for output tasks. The client binary 108 may consume output tasks as they become available.

The universal numerics workers 112a-c each include a numerics interface. The numerics interface streamlines and automates the numerical experimentation pipeline on the user side of the numerical quantum experimentation system 100. The numerics interface 202 also makes efficient use of cross-datacenter computing resources on the server side. The numerics interface may be an application programming interface for numerical algorithms that are compiled together into a single library, where the size of the universal numerics worker binary is only negligibly affected by the individual numerical algorithms. The single library may be linked against by each of the universal numerics workers 112a-c. A resulting individual universal numerics worker may be dynamically instructed to execute a particular numerical algorithm through configuration received as part of an input task provided by the client via the taskmaster, e.g., input task 120 and 122. In this manner an entire experimental suite of different quantum simulations alongside various classical benchmarking algorithms may be submitted by a human experimenter or user in a single step. The numerics interface is described below with reference to FIG. 2.

The numerical quantum experimentation system 100 may be configured to receive as input data identifying a computational problem that is a candidate for a quantum computation, and one or more numerical algorithms for solving the candidate computational problem, e.g., data identifying candidate computational problem and algorithms 102. For example, the candidate computational problem may include classically simulating a quantum system or an abstract computational problem. The one or more numerical algorithms may include one or more of (i) classical simulations of quantum systems, (ii) physically motivated classical algorithms, or (iii) abstract classical algorithms. In some implementations the numerical quantum experimentation system 100 may be further configured to receive as input data identifying a respective set of parameter values for each of the one or more numerical algorithms.

A user of the numerical quantum experimentation system 100 defines the full suite of numerical tasks that needs to be completed. As described above, this suite of numerical tasks can include a collection of runs of simulated annealing, quantum Monte Carlo, spin vector Monte Carlo, etc., with different parameters and on a collection of different problem instances and even different problem classes. In some implementations the suite of numerical tasks can be a sequence of numerical tasks derived by the user for the purpose of achieving some other high-level goal, e.g. the simulation of a large quantum circuit broken down into small pieces.

The client 108 may be configured to receive the input data, e.g., data identifying candidate computational problem and algorithms 102, and to construct configuration strings corresponding to the full suite of numerical tasks defined by the user. The client 108 may submit the configuration strings in the form of numerics workflow input tasks, e.g., input tasks 120, to the taskmaster 110, e.g., via one or more remote procedure calls.

The taskmaster 110 may be configured to store received input tasks, e.g., input tasks 120. For example, the taskmaster 110 may include an input task database 114 for storing received input tasks. The taskmaster 110 may be configured to assign individual input tasks to respective universal numerics workers, e.g., universal numerics workers 112a-c. In some implementations the taskmaster 110 may assign an individual input task, e.g., input task 122, to a universal numerics worker, e.g., universal numerics worker 112a, when the respective universal numerics worker queries the taskmaster 110 for available work, e.g., query 124. The respective universal numerics worker may be configured to execute one or more of the following steps:

Read the received task configuration
Extract input parameters
Read problem data from file
Determine which numerical algorithm has been requested by the user to work on the current task
Construct a Numerics object of the appropriate type
Call a Run( )method of the Numerics object
Construct an output task out of the string returned by Run ( )
Submit output task back to the taskmaster Universal numerics workers are described in more detail below with reference to FIGS. 2 and 3.

The taskmaster 110 may be configured to ensure that no task is simultaneously worked on by more than one universal numerics worker and, in case a numerics worker goes down, the taskmaster 110 may be configured to assign the unfinished task to another universal numerics worker. If a task has to be reassigned to a different universal numerics worker, that numerics worker may commence working on the task from the beginning, e.g., a partial computation from a previous numerics worker may not be used to assist the current numerics worker.

Often, numerical tasks submitted to the numerical quantum experimentation system 100, e.g., data identifying candidate computational problem and algorithms 102, may be broken down into multiple independent (or at most loosely coupled) smaller tasks. The individual smaller tasks can be performed quicker than the main task and results of solving the smaller tasks may be committed to the taskmaster 110. Therefore, there may never be any loss of large amounts of work, thus obviating the need for adding fault tolerance measures, e.g., checkpointing, to the system 100. Avoiding the need to implement fault tolerance measures may make it easy to quickly deploy new numerical algorithms to the universal numerics workers 112a-c, since individual fault tolerance measures, e.g., checkpointing, for possibly very differently designed and implemented software is not a concern. Also, the overhead of file I/O makes fault tolerance, e.g., checkpointing, inefficient for sufficiently small tasks.

When an output task is received from a universal numerics worker, e.g., output task 126, the taskmaster 110 may be configured to remove the corresponding input task from the pool of unfinished work, thereby ensuring the atomic consumption of each input task and the production of corresponding output tasks. Atomicity comes from the taskmaster 110 ensuring that (i) there can never be multiple universal numerics workers simultaneously working on the same input task; (ii) if the assigned numerics worker dies, another one will be assigned to work on that task; and (iii) a single unique output task will be produced for every input task.

While the taskmaster 100 is coordinating with universal numerics workers 112a-c regarding the consumption of input tasks, e.g., input task 122, and production of output tasks, e.g., output task 126, the client 108 may be configured to periodically query the taskmaster 110 for available output tasks, e.g., query 128. If there are available output tasks, e.g., stored in an output task database 116 at the taskmaster 110, the taskmaster 110 may be configured to provide them to the client 108, e.g., output tasks 130. The client 108 may be configured to then parse received output task payloads and process the results in a user defined manner.

The numerical quantum experimentation system 100 may provide the processed results, e.g., data representing results of using algorithms to solve candidate computational problem 104, as output. The output results may be used to determine whether quantum computation applied to the candidate computational problem has a greater efficacy for arriving at a solution than a classical computation applied to the candidate computational problem. Determining whether quantum computation applied to a candidate computational problem has a greater efficacy for arriving at a solution than a classical computation applied to the candidate computational problem is described in more detail below with reference to FIG. 4.

In some implementations the numerical quantum experimentation system may include multiple taskmasters, where each taskmaster is configured to manage universal numerics workers that are located within a predetermined distance to the respective taskmaster. In these implementations, the division of the main task into individual smaller tasks is still performed at the client 108. With multiple interacting taskmasters, the client 108 may be configured to submit tasks to any one of the available taskmasters. The taskmasters may then exchange and shuffle around tasks as part of resource adjustments and load balancing.

A higher level of work coordination may be required when a number of numerical tasks that need to be considered simultaneously exceeds the processing power and network bandwidth of a single taskmaster machine. The automatic control and coordination of multiple taskmasters may also be achieved by using additional logic in the universal numerics worker binary that gets activated by special tasks passed around the global system. The global/local resource adjustments and load balancing of the entire system may be achieved by permanent and indelible mission control (MC) tasks.

Typically, an MC task may reside at one or more taskmasters and may be periodically released to a worker for evaluation. When a worker receives an MC task, that worker may be configured to execute the global resource adjustments and load balancing logic built into the universal numerics worker binary. The logic may involve queries of the current computational load present in the local taskmaster as well as any number of remote taskmasters; it may query the amount of currently deployed worker resources; it may evaluate the performance of currently available workers and the computational demands of the currently queued numerical tasks; finally, it may issue commands for correction of deployed resources and reallocation of numerical tasks among available taskmasters for global load balancing. The worker may then record relevant state information in the MC task and return it to its taskmaster where it stays dormant until the next scheduled maintenance period.

In some implementations the numerical quantum experimentation system 100 may be configured to receive input tasks from multiple users of the numerical quantum experimental system. For example, in some cases there may be multiple users working on different projects, each completing their own numerical jobs concurrently. In this case, it may be useful for different users to be able to submit tasks to a numerical quantum experimentations system that is continuously running, e.g., as opposed to each user starting up and managing their own numerical quantum experimentation system.

Since the numerics workers are universal numerics workers and use the same worker binary that packages together all available numerical algorithms, different users must use the same worker binary. However, when a new numerical algorithm is added to the binary or there are updates to existing binaries, a new worker binary is built. The system may then push updates to the service, e.g., by having rolling updates of the worker binaries so that newly submitted tasks can be worked on, leaving some workers with older versions until they are no longer needed, or building into the numerical tasks some knowledge of which binary version they are meant for. Numerics workers with the wrong binary version would be configured to not be eligible to work on those tasks.

Furthermore, whenever the total workload from all concurrent users causes resource limits to be approached or exceeded, the system may use priorities assigned to individual tasks in order to select ones to be given next to available universal numerics workers. The numerical quantum experimentation system 100 may also be configured to maintain a live dashboard listing all current jobs/users with approximate ETAs based on how long it has taken universal numerics workers to deliver results from individual input tasks so far. Then, if some user is setting their jobs at a high priority and is thereby starving other jobs, an admin can be automatically alerted and some manual action can be taken. Such usage could also be legitimate.

In some implementations each of the universal numerics workers 112a-c may be configured to issue resource adjustment commands based on current load as measured by a number of tasks waiting for completion. For example, the universal numerics workers 112a-c may be configured to periodically issue resource adjustment commands based on the current load as measured by the number of numerical tasks waiting for completion at the task master. This may be implemented by an undeletable task that periodically goes back and forth between the taskmaster 110 and any free universal numerics worker. For example, the undeletable task may sleep at the taskmaster when resource adjustments are not needed and be periodically released to a universal numerics worker who takes it as a token of needing to evaluate the current load situation and issue resource adjustments as necessary. There may be several benefits of automating resource adjustment. For example, automatic resource adjustment removes the need to continuously monitor the system load and make repeated manual adjustments. In addition, energy and overall computational resource savings may be achieved. Furthermore, automated resource adjustments may be more accurate and timely than any human intervention.

In some implementations the universal numerics worker binary may include an experimental design logical layer that is configured to apply machine learning algorithms to determine learned parameters for a current input task based on completed input tasks. Fully specifying an entire set of numerical tasks that need to be completed involves a considerable amount of educated guesswork as to the appropriate parameter sets to be evaluated. This process may result in high cost in terms of engineering time on the part of the human scientist who is operating the client machine, i.e., numerical quantum experimentation system 100. In addition, sometimes there may be a tendency of a human scientist behind the client machine needing to go back and define more and more sets of numerical tasks based on results seen from the previously completed sets of tasks. Such a human intensive iterative process may be automated in the numerical quantum experimentation system 100 by a machine learning algorithm, e.g. Gaussian processes. Such algorithms may be used to incrementally build a model in hyperparameter space (where hyperparameters are different to parameters of a numerical algorithm) based on completed numerical tasks and automatically construct subsequent batches of numerical tasks that are deemed to be helpful in refining the current model of the hyperparameter optimization landscape.

The experimental design logical layer can be included in the universal numerics worker binary and any worker may be configured to execute the logic in the logical layer given a received task that requests further refining of a hyperparameter model in the presence of newly completed numerical tasks that might have been specified during a prior iteration of the experimental design algorithm.

The numerical quantum experimentation system 100 may be configured to shut down automatically once the experimental design layer reaches the stopping criterion of its hyperparameter model, since this is the point at which the model cannot be refined further and the optimal parameter set has been seen and evaluated.

By including an experimental design logical layer, input from human scientists may be reduced to a minimum level. For example, a human scientist may only need to initialize the numerical quantum experimentation system 100 by specifying the problem instances, the numerical algorithms of interest, and in some implementations a loose guess of initial parameter ranges that can be used for bootstrapping the experimental design algorithm. After the experimental design algorithm detects satisfied termination criteria, it stops the generation of new tasks, waits for the completion of any remaining ones (or just terminates them), and finally the human scientist receives data representing a summary of salient results.

Figure 2:
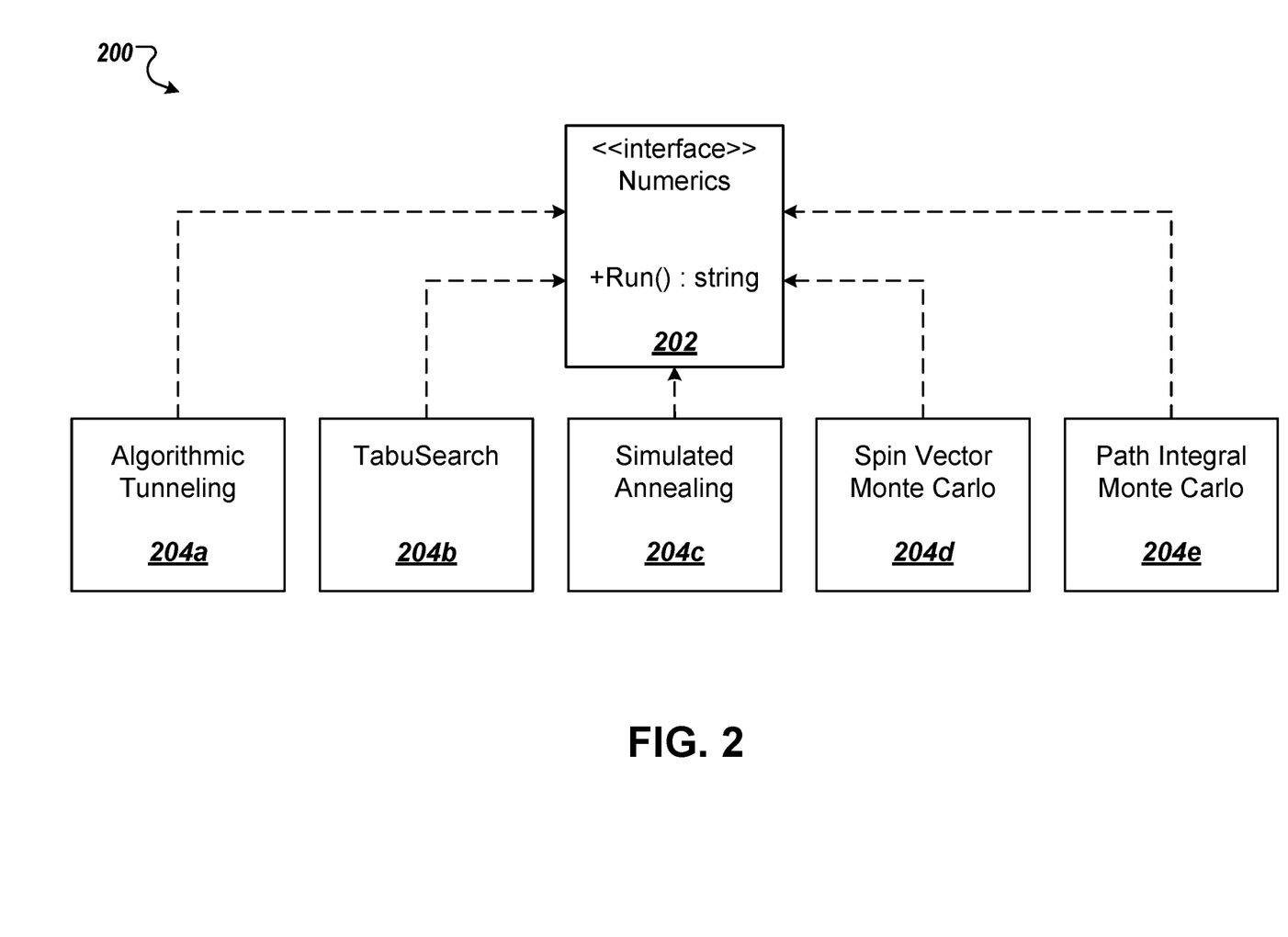
FIG. 2 shows an example universal numerics worker class diagram.

FIG. 2 depicts an example universal numerics worker class diagram 200. For example, the example universal numerics worker class diagram 200 may depict a class diagram for the universal numerics workers 112a-c of numerical quantum experimentation system 100 as described above with reference to FIG. 1.

As described above with reference to FIG. 1, each universal numerics worker in the numerics quantum experimentation system 100 includes a numerics interface, e.g., numerics interface 202. The numerics interface 202 shields each universal numerics worker from knowledge particular to any specific numerical algorithm, e.g., algorithms 204a-e. For example, upon receiving data identifying a candidate computational problem and one or more algorithms 102, the client 108 may be configured to fill in an "algorithm_name" field in a universal numerics worker input protobuf message, which may be subsequently wrapped into a Workflow input task. The client 108 may then be configured to submit the input task to the taskmaster 110.

Continuing the example, at the numerics worker side the "algorithm_name" string extracted from the input task may be passed to a factory that has knowledge of the different implementations of the numerics interface and may be able to construct an object of the requested type. In addition to the appropriate numerics object constructed by the factory, the universal numerics worker may also maintain a polymorphic data wrapper object of a particular base type. The instance data may be initially written into a numerics data object according to the task configuration, e.g., by the factory constructing the numerics object. The instance data may be subsequently read out of the numerics data object by the numerics algorithm after the Run( ) function of the numerics object is called.

Figure 3:
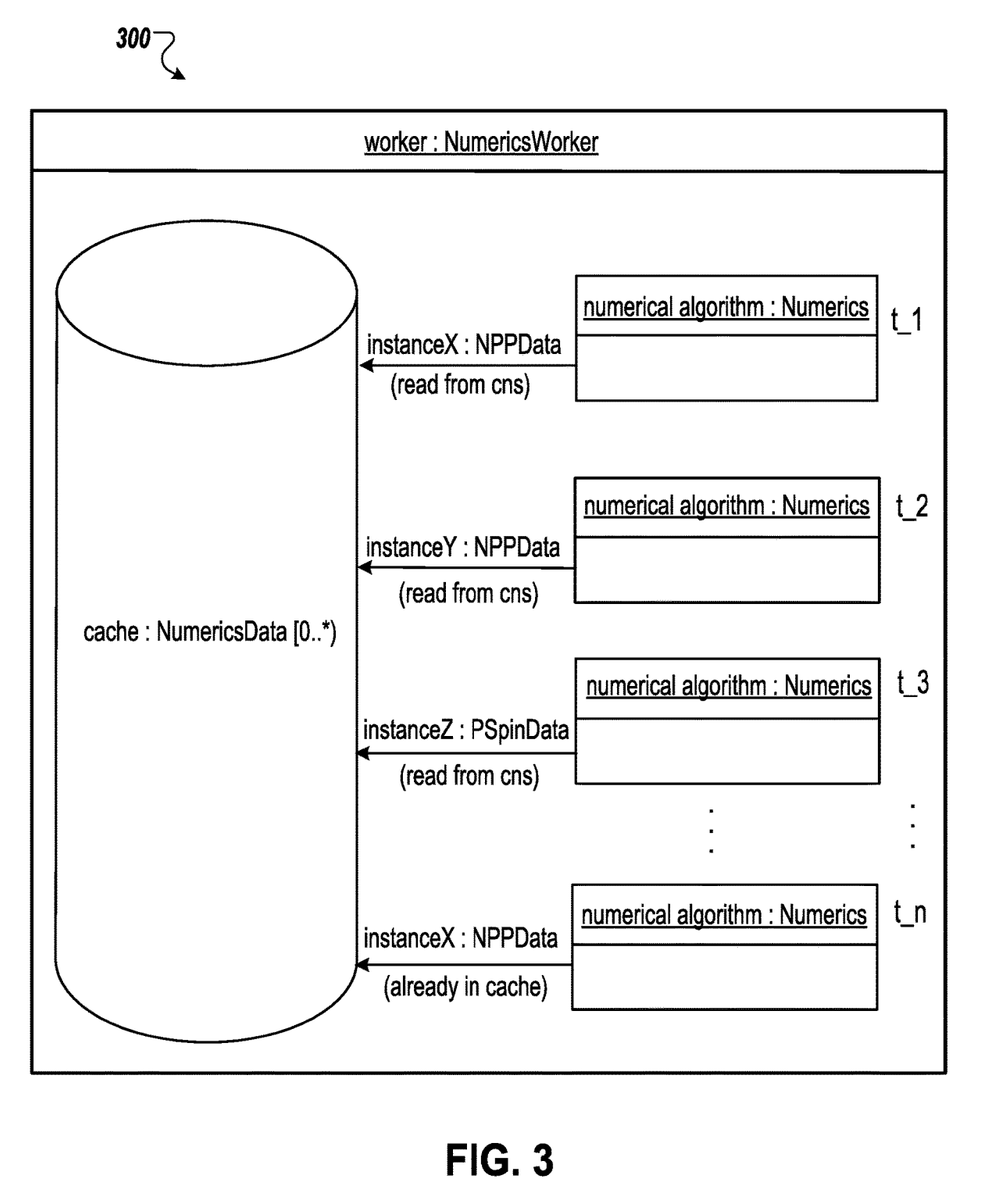
FIG. 3 shows an example caching strategy of a universal numerics worker.

FIG. 3 shows an example caching strategy 300 of a universal numerics worker. As described above with reference to FIGS. 1 and 2, the universal numerics workers include a numerics interface that shields the universal numerics workers from knowledge particular to any specific algorithm. Instance data may be initially written into a numerics data object according to a task configuration and subsequently read out of the numerics data object by a numerics algorithm after a run( ) function of the numerics data object is called. Separating the numerics data from the numerics algorithm in this way offers valuable caching opportunities for the universal numerics worker.

Since there may be a large number of input tasks calling for executing different numerics algorithms with different parameter sets on the same problem instance, the universal numerics worker should not have to read instance data every time a new input task arrives. Instead, the universal numerics workers are configured to keep a cache of constructed numerics data objects that have been needed by prior input tasks. When a new input task is received, the universal numerics worker may first check whether the instance data required for that task is already present in the cache. The universal numerics worker may read the instance data from a caching name server location pointed to by the input task configuration only if the cache does not already have it. With large hyperparameter spaces for individual numerical algorithms and with large numbers of numerical algorithms to be evaluated, this caching strategy can potentially result in significant efficiency improvements and avoidance of unnecessary contention at locations where the instance data are stored.

The design of the numerics workers, as described in FIGS. 1-3, namely linking the numerics workers against a numerics library, means that the numerics workers are universal and enables numerics workers to execute any implemented numerical algorithms, solely based on a configuration specified by a user of the numerical quantum experimentation system 100 and submitted by the user to the taskmaster via the client. Universal numerics workers, as described in this specification, allow for many different numerical algorithms to be packaged together in the same binary that numerics workers execute. Since the client may submit tasks requesting the completion of runs using any of the different available numerical algorithms, the ability of a worker to select the appropriate algorithm in its portfolio and appropriately execute it is crucial to the attained efficiency and ease of use of the overall experimentation pipeline.

Programming the Hardware

Figure 4:
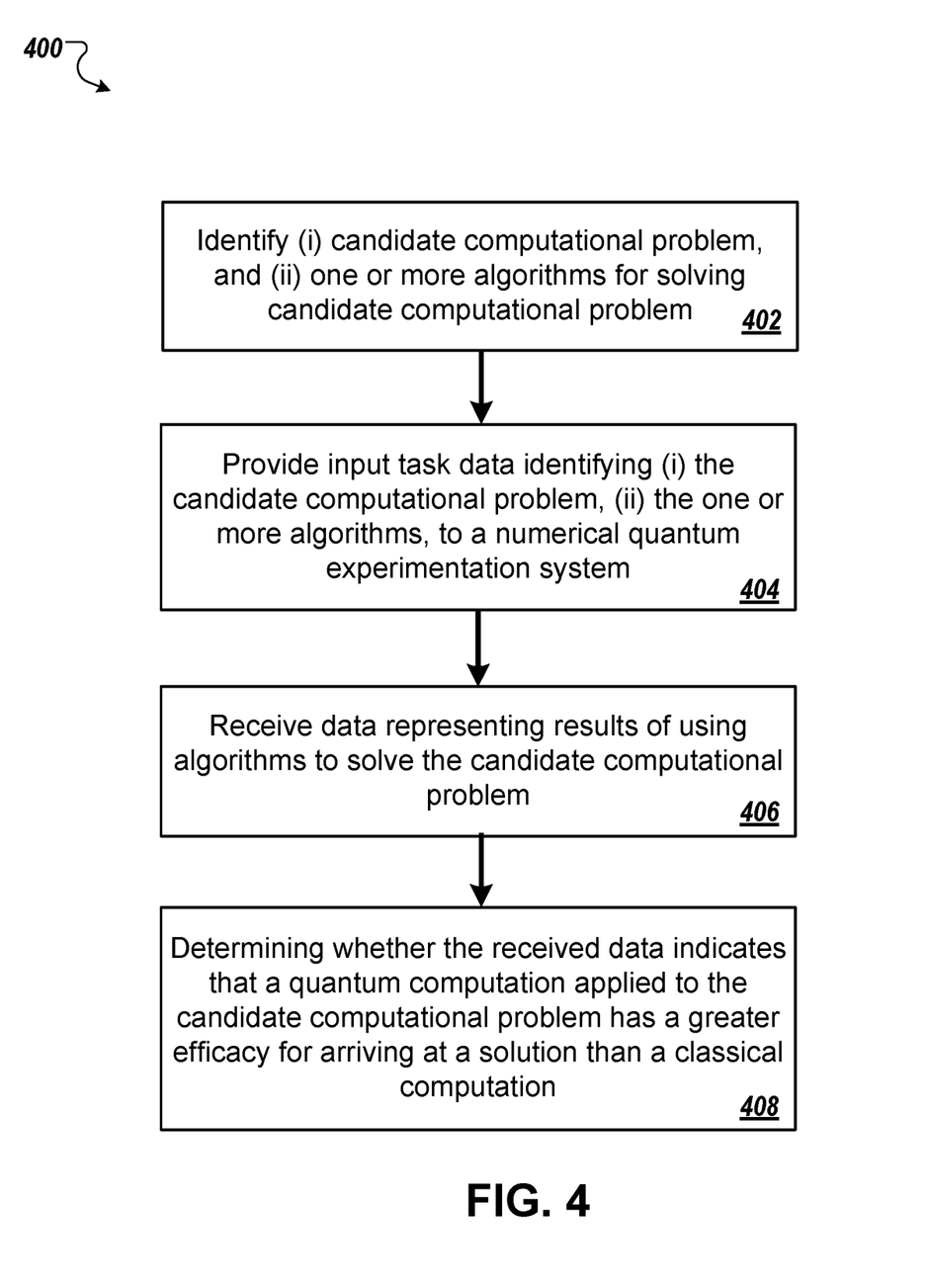
FIG. 4 is a flow diagram of an example process for determining whether a quantum computation applied to a candidate computational problem has a greater efficacy for arriving at a solution than a classical computation applied to the candidate computational problem.

FIG. 4 is a flowchart of an example process 400 for determining whether a quantum computation applied to a candidate computational problem has a greater efficacy for arriving at a solution than a classical computation applied to the candidate computational problem. For convenience, the process 400 will be described as being performed by a system of one or more classical or quantum computing devices located in one or more locations. For example, a system including a numerical quantum experimentation system, e.g., including the system 100 of FIG. 1, appropriately programmed in accordance with this specification, can perform the process 400.

A computational problem that is a candidate for a quantum computation and one or more numerical algorithms for solving the candidate computational problem are identified (step 402).

In some implementations the identified candidate computational problem may include the problem of classically simulating a quantum system, e.g., classically simulating spin chain systems or high temperature conductivity systems. In some implementations the candidate computational problem may include an abstract computational problem, e.g., a travelling salesman problem or 3-SAT problem.

In some implementations the identified one or more numerical algorithms include one or more of (i) classical simulations of quantum systems, e.g., integration of the Schroedinger equation or exact diagonalization, (ii) physically motivated classical algorithms, e.g., simulated annealing, spin vector Monte Carlo, path integral Monte Carlo, or (iii) abstract classical algorithms, e.g., Tabu search, branch and bound methods, stochastic local search, large neighborhood search algorithms.

In some implementations identifying one or more numerical algorithms for solving the candidate computational problem includes identifying a respective set of parameter values for the algorithm for each identified numerical algorithm. For example, in some implementations the identified candidate computational problem may be an optimization problem and the identified one or more algorithms may include simulated annealing. In this case, a respective set of parameter values for the algorithm may include multiple temperature reduction schedules for the simulated annealing.

Input task data identifying (i) the candidate computational problem, and (ii) the one or more numerical algorithms, is provided to a numerical quantum experimentation system (step 404). For example, the input task data may be provided to a client component of a numerical quantum experimentation system, e.g., client 108 of system 100 described above with reference to FIG. 1.

The numerical quantum experimentation system includes multiple universal numerics workers, where at least one of the numerics worker of the multiple numerics workers is configured to solve the candidate computational problem using the one or more algorithms. In some implementations each of the numerics workers are configured to solve the candidate computational problem using the one or more algorithms. As described above with reference to FIG. 1, each universal numerical worker includes a same binary, where the binary comprises a predetermined set of numerical algorithms in a compiled form. For example, each universal numerics worker may be configured to receive dynamical instructions from a numerical quantum experimentation system taskmaster, e.g., taskmaster 110, to execute a particular algorithm in the predetermined set of numerical algorithms through configuration received as part of an input task provided by a numerical quantum experimentation system client via the taskmaster.

As described above with reference to FIG. 1, in some implementations the binary may include an experimental design logical layer that is configured to apply machine learning algorithms to determine learned parameters for a current input task based on completed input tasks. For example, the system may apply regression techniques to predict where good or optimal hyperparameter settings lie, e.g., Gaussian processes. Applying Gaussian processes may include determining a particular algorithm for iterative generation of batches of points taken from the domain of an unknown function that is to be optimized. Once a batch has been generated, the points in it may be evaluated in parallel. Gaussian processes may be used to model an uncertainty in a current model after evaluating successive batches and, based on that model, to generate a next batch of points for evaluation. An objective of the whole algorithm may be to minimize "batch cumulative regret", which may be defined as a summed distance of generated batches from the optimum.

As described above with reference to FIG. 1, in some implementations each universal numerics worker may include a respective cache of constructed numerics data objects from prior input tasks. In these cases, in response to receiving a new input task, the system may determine, by the universal numerics worker, whether the cache includes data required for the new input task. In response to determining that the cache includes data required for the new input task, the system may retrieve and use the data required for the new input task.

The system receives, from the numerical quantum experimentation system, data representing results of the one or more algorithms to solve the candidate computational problem (step 406). In some implementations data representing a result of using a respective numerical algorithm to solve the candidate computational problem may include data representing respective computation runtime. In some implementations data representing a result of using a respective numerical algorithm to solve the candidate computational problem may include data representing a measure from the numerical algorithm, e.g., a total number of sweeps in quantum Monte Carlo needed for achieving 99% probability of finding the ground state. Such measures may be projected to an estimated runtime on quantum computation hardware, e.g., a quantum annealer, which may be built or used in the future. The data representing results of using each of the one or more algorithms to solve the candidate computational problem may include data at different problem sizes, and may be used to perform curve fitting to extrapolate a scaling law for the computation runtime as a function of problem size.

As described above with reference to FIG. 1, in some implementations the system may receive data representing results of using each of the one or more numerical algorithms to solve the candidate computational problem when the respective result is available, i.e., the system may not receive the data representing the results of using each of the one or more numerical algorithms to solve the candidate computational problem in one data package.

The system determines whether the received data indicates that a quantum computation applied to the candidate computational problem has a greater efficacy for arriving at a solution than a classical computation applied to the candidate computational problem (step 408).

In some implementations the system determines whether a quantum computation applied to the candidate computational problem has a greater efficacy for arriving at a solution than a classical computation applied to the candidate computational problem by determining that the candidate computational problem experiences a quantum speed up when solved using quantum computation.

In some implementations the system determines whether the received data indicates that a quantum computation applied to the candidate computational problem has a greater efficacy for arriving at a solution than a classical computation applied to the candidate computational problem by determining, for each numerical algorithm used to solve the candidate computational problem, an algorithm runtime. The system may then analyze the determined runtimes to determine whether the received data indicates that a quantum computation applied to the candidate computational problem has a greater efficacy for arriving at a solution than a classical computation applied to the candidate computational problem.

As described above with reference to step 402, in some implementations the one or more numerical algorithms may include a classical simulation of a quantum system and one or more classical algorithms. In these implementations, the system may analyze the determined runtimes to determine whether the received data indicates that a quantum computation applied to the candidate computational problem has a greater efficacy for arriving at a solution than a classical computation applied to the candidate computational problem by comparing the runtime of the classical simulation of the quantum system to the runtimes of each of the one or more classical algorithms to determine whether the runtime of the classical simulation of the quantum system is shorter than the runtimes of each of the one or more classical algorithms.

In some cases the determined runtimes may include runtimes that are not directly measured by an actual physical runtime on a classical machine, e.g., a numerics worker, since classical machines may vary considerably, e.g., in terms of CPU architecture, memory caches, memory bus speeds or bandwidths, and may suffer from various I/O or system overheads that could affect a timing result of a direct measurement attempt. For example, the system may analyze the received data to determine whether a quantum computation applied to the candidate computational problem has a greater efficacy for arriving at a solution than a classical computation applied to the candidate computational problem by analyzing one or more measures relating to the numerical algorithms used to obtain a solution to the computational problem. For example, the system may select a measure from the numerical algorithm, e.g., a total number of sweeps in a quantum Monte Carlo needed to achieve a high probability of finding the ground state, and project this measure to an estimated runtime on quantum hardware, e.g., a quantum annealer. The estimated runtime on quantum hardware may then be used to determine whether a quantum computation applied to the candidate computational problem has a greater efficacy for arriving at a solution than a classical computation applied to the candidate computational problem.

As another example, the system may use the received data to determine scaling laws. For example the system may use received data for different problem sizes to perform curve fitting and extrapolate a scaling law for runtime as a function of problem size. Based on the determined scaling law, the system may determine whether a quantum computation applied to the candidate computational problem has a greater efficacy for arriving at a solution than a classical computation applied to the candidate computational problem.

As a further example, the system may use the received data to determine an approximability measure of quantum computation and classical computation. For example, the system may consider how quantum and non-quantum methods of computation compare when the goal is to find a solution of a certain quality Q or better, where Q corresponds to an approximate solution of the problem rather than an exact solution to the problem. The determined approximability may be used by the system to determine whether a quantum computation applied to the candidate computational problem has a greater efficacy for arriving at a solution than a classical computation applied to the candidate computational problem.

In some implementations, in response to determining that a quantum computation applied to the candidate computational problem has a greater efficacy for arriving at a solution than a classical computation applied to the candidate computational problem, a quantum computation may be performed to solve the candidate computational problem. For example, as described above, in some implementations the candidate computational problem may include an optimization problem, and the one or more algorithms used to solve the optimization problem may include simulated annealing. In response to determining that a quantum computation applied to the optimization problem has a greater efficacy for arriving at a solution to the optimization problem, quantum annealing may be performed to solve the optimization problem in future applications.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for numerical quantum experimentation, comprising:
   receiving, by a client in a numerical quantum experimentation system, data identifying (i) a computational problem that is a candidate for a quantum computation, and (ii) one or more numerical algorithms for solving the computational problem;
   providing input task data identifying (i) the computational problem and (ii) the one or more numerical algorithms to a taskmaster included in the numerical quantum experimentation system, wherein the taskmaster assigns individual input tasks to respective universal numerics workers of multiple universal numerics workers included in the numerical quantum experimentation system, each input task calling for execution of a respective numerical algorithm of the one or more numerical algorithms on the computational problem, wherein
      the multiple universal numerics workers comprise a same binary, the binary comprising a predetermined set of numerical algorithms in a compiled form, and each universal numerics worker is configured to solve the computational problem using the one or more numerical algorithms;
   receiving, from the numerical quantum experimentation system, data representing results of the one or more numerical algorithms to solve the computational problem; and
   determining whether the received data indicates that a quantum computation applied to the computational problem has a greater efficacy for arriving at a solution than a classical computation applied to the computational problem.

2. The method of claim 1, wherein the universal numerics worker is configured to receive dynamical instructions from a numerical quantum experimentation system taskmaster to execute a particular algorithm in the predetermined set of numerical algorithms through configuration received as part of an input task provided by a numerical quantum experimentation system client via the taskmaster.

3. The method of claim 1, wherein the universal numerics worker comprises a numerics interface that shields the universal numerics worker from knowledge particular to any specific numerical algorithm.

4. The method of claim 1, wherein the binary comprises an experimental design logical layer that is configured to apply machine learning algorithms to determine learned parameters for a current input task based on completed input tasks.

5. The method of claim 1, wherein the universal numerics worker comprises a respective cache of constructed numerics data objects from prior input tasks, and wherein the method further comprises, in response to receiving a new input task:
   determining, by the universal numerics worker, whether the cache comprises data required for the new input task; and
   in response to determining that the cache comprises data required for the new input task, retrieving and using the data required for the new input task.

6. The method of claim 1, further comprising, in response to determining that a quantum computation applied to the computational problem has a greater efficacy for arriving at a solution than a classical computation applied to the computational problem, performing a quantum computation to solve the computational problem.

7. The method of claim 1, wherein determining that a quantum computation applied to the computational problem has a greater efficacy for arriving at a solution than a classical computation applied to the computational problem comprises determining that the computational problem experiences a quantum speed up when solved using quantum computation.

8. The method of claim 1, wherein the computational problem comprises one or more of (i) classically simulating a quantum system or (ii) an abstract computational problem.

9. The method of claim 8, wherein the one or more numerical algorithms comprise one or more of (i) classical simulations of quantum systems, (ii) physically motivated classical algorithms, or (iii) abstract classical algorithms.

10. The method of claim 1, wherein identifying one or more numerical algorithms for solving the computational problem further comprises, for an identified numerical algorithm, identifying a respective set of parameter values for the algorithm.

11. The method of claim 1, wherein receiving data representing results of the one or more numerical algorithms to solve the computational problem comprises receiving data representing a result when the respective result is available.

12. The method of claim 1, wherein data representing a result of a respective numerical algorithm to solve the computational problem comprises data representing respective computation time.

13. The method of claim 1, wherein determining whether the received data indicates that a quantum computation applied to the computational problem has a greater efficacy for arriving at a solution than a classical computation applied to the computational problem comprises:

determining, for each numerical algorithm used to solve the candidate computational problem, an algorithm runtime;

analyzing the determined runtimes to determine whether the received data indicates that a quantum computation applied to the computational problem has a greater efficacy for arriving at a solution than a classical computation applied to the computational problem.

14. The method of claim 13, wherein the one or more numerical algorithms comprise (i) a classical simulation of a quantum system, and (ii) one or more classical algorithms, and wherein analyzing the determined runtimes to determine whether the received data indicates that a quantum computation applied to the computational problem has a greater efficacy for arriving at a solution than a classical computation applied to the computational problem comprises comparing the runtime of the classical simulation of the quantum system to the runtimes of each of the one or more classical algorithms to determine whether the runtime of the classical simulation of the quantum system is shorter than the runtimes of each of the one or more classical algorithms.

15. The method of claim 1, wherein determining whether the received data indicates that a quantum computation applied to the computational problem has a greater efficacy for arriving at a solution than a classical computation applied to the computational problem comprises:

analyzing the received data to extrapolate a scaling law for computation runtime as a function of problem size; and based on the scaling law, determining whether a quantum computation applied to the computational problem has a greater efficacy for arriving at a solution than a classical computation applied to the computational problem.

16. The method of claim 1, wherein determining whether the received data indicates that a quantum computation applied to the computational problem has a greater efficacy for arriving at a solution than a classical computation applied to the computational problem comprises:

using the received data to determine an approximability measure of quantum computation and classical computation; and based on the determined approximability measure, determining whether the received data indicates that a quantum computation applied to the computational problem has a greater efficacy for arriving at a solution than a classical computation applied to the computational problem.

17. The method of claim 1, wherein the universal numerics worker is configured to issue resource adjustment commands based on current load as measured by a number of tasks waiting for completion.

18. The method of claim 1, wherein the numerical quantum experimentation system comprises multiple taskmasters, wherein a taskmaster of the multiple taskmasters is configured to manage universal numerics workers that are located within a predetermined distance to the taskmaster.

19. The method of claim 1, wherein the numerical quantum experimentation system is configured to receive input tasks from multiple users of the numerical quantum experimental system.

20. A numerical quantum experimentation system, comprising:

a client;

one or more taskmasters;

multiple universal numerics workers, wherein each of the multiple universal numerics workers comprises a same binary, the binary comprising a predetermined set of numerical algorithms in a compiled form;

wherein the numerical quantum experimentation system is configured to perform operations comprising:

receiving, by a taskmaster, input task data identifying (i) a candidate computational problem, the candidate computational problem comprising a candidate for a quantum computation, and (ii) one or more numerical algorithms, wherein a universal numerics worker, of the multiple universal numerics workers, is configured to solve the candidate computational problem using the one or more algorithms;

assigning, by the taskmaster, individual input tasks to respective universal numerics workers, wherein each input task calls for execution of a respective numerical algorithm of the one or more numerical algorithms on the candidate computational problem;

solving, by the universal numerics workers, the candidate computational problem using the one or more algorithms;

providing, as output, data representing results of the one or more algorithms to solve the candidate computational problem; and determining whether the data representing results of the one or more algorithms to solve the candidate computational problem indicates that a quantum computation applied to the candidate computational problem has a greater efficacy for arriving at a solution than a classical computation applied to the candidate computational problem.

21. The system of claim 20, wherein the universal numerics worker is configured to receive dynamical instructions from a numerical quantum experimentation system taskmaster to execute a particular algorithm in the predetermined set of numerical algorithms through configuration received as part of an input task provided by a numerical quantum experimentation system client via the taskmaster.

22. The system of claim 20, wherein the universal numerics worker comprises a numerics interface that shields the universal numerics worker from knowledge particular to any specific numerical algorithm.

23. The system of claim 20, wherein the binary comprises an experimental design logical layer that is configured to apply machine learning algorithms to determine learned parameters for a current input task based on completed input tasks.

24. The system of claim 20, wherein the universal numerics worker comprises a respective cache of constructed numerics data objects from prior input tasks, and wherein solving the candidate computational problem using the one or more algorithms comprises:

determining, by the universal numerics worker, whether the cache comprises data required for a new input task; and in response to determining that the cache comprises data required for the new input task, retrieving and using the data required for the new input task.

25. The system of claim 20, wherein the universal numerics worker is configured to issue resource adjustment commands based on current load as measured by a number of tasks waiting for completion.

26. The system of claim 20, wherein the one or more taskmasters are configured to manage universal numerics workers that are located within a predetermined distance to the respective taskmaster.

27. The system of claim 20, wherein the numerical quantum experimentation system is configured to receive input tasks from multiple users of the numerical quantum experimental system.

28. The system of claim 20, wherein the candidate computational problem comprises one or more of (i) classically simulating a quantum system or (ii) an abstract computational problem.

29. The system of claim 28, wherein the one or more numerical algorithms comprise one or more of (i) classical simulations of quantum systems, (ii) physically motivated classical algorithms, or (iii) abstract classical algorithms.

30. The system of claim 20, wherein the numerical quantum experimentation system is further configured to receive input task data identifying, for the one or more numerical algorithms, a respective set of parameter values for the algorithm.

* * * * *